No. 887,241. PATENTED MAY 12, 1908.
W. C. FOWNES, Jr. & R. J. GARDNER.
PIT CAR WHEEL.
APPLICATION FILED JULY 12, 1906.
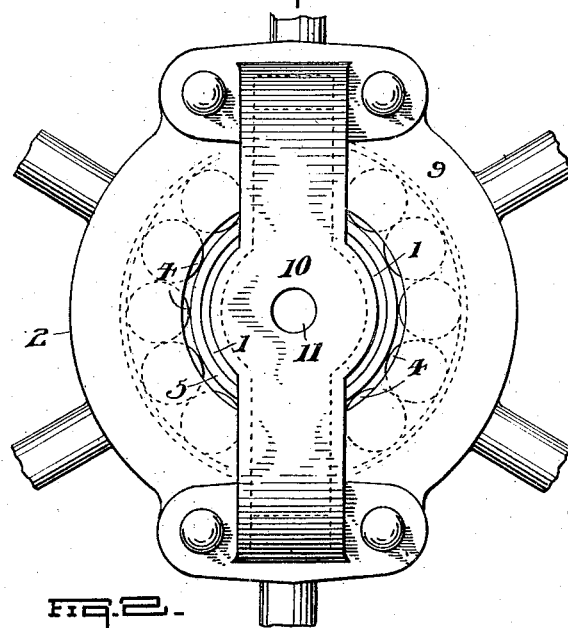
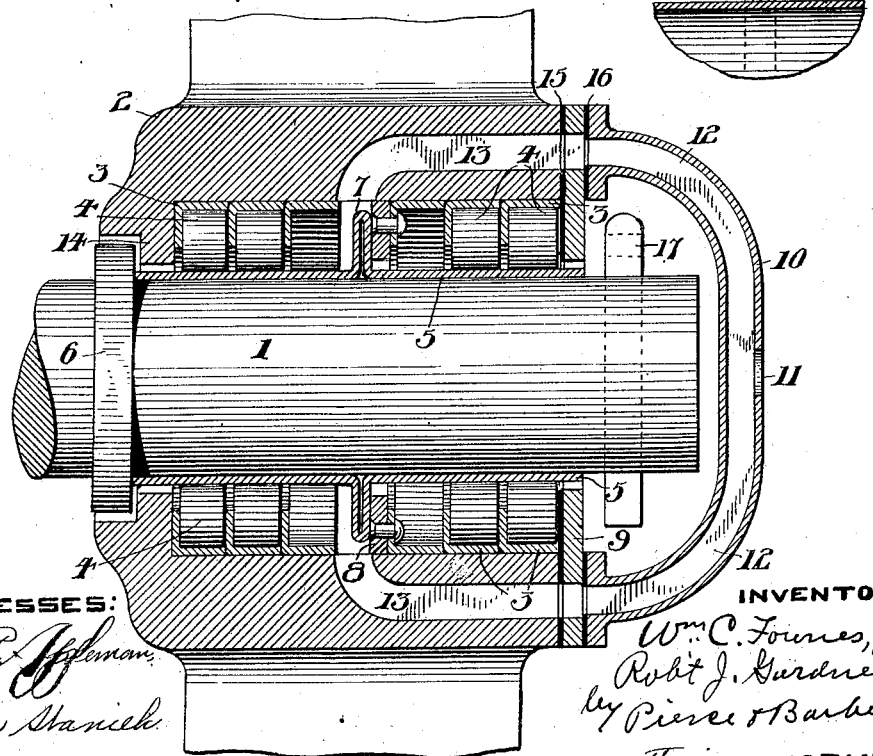

UNITED STATES PATENT OFFICE.

WILLIAM C. FOWNES, JR., AND ROBERT J. GARDNER, OF PITTSBURG, PENNSYLVANIA, ASSIGNORS TO S. JARVIS ADAMS COMPANY, OF PITTSBURG, PENNSYLVANIA, A CORPORATION OF PENNSYLVANIA.

PIT-CAR WHEEL.

No. 887,241.　　　　Specification of Letters Patent.　　　　Patented May 12, 1908.

Application filed July 12, 1906. Serial No. 325,764.

*To all whom it may concern:*

Be it known that we, WILLIAM C. FOWNES, Jr., and ROBERT J. GARDNER, citizens of the United States, both residing at Pittsburg, in the county of Allegheny and State of Pennsylvania, have invented or discovered new and useful Improvements in Pit-Car Wheels, of which the following is a specification.

Our invention relates to improvements in wheels, pulleys, and other rotary devices, and some of its objects are to produce a device of this character which will avoid friction at those parts which ordinarily are not well oiled; to provide a special thrust bearing which is at all times so located as to be thoroughly oiled; and to provide a rotary device of the kind described which shall have an oil feeding device permanently secured over the end of the axis, and at the same time permitting inspection of the end of the axis and access to the fastening devices.

These and other objects will be fully explained in the description following.

Referring to the drawings which form a part of this specification, Figure 1 is an end elevation of a selected form of our invention. Fig. 2 is a longitudinal section of a wheel, embodying our improvements. Fig. 3 is a section showing a modified sleeve and bearing.

On the drawings, 1 represents the axle and 2 the hub of a wheel rotarily mounted on the axle. The interior of the hub is provided with two series or sets of circular runways or races 3 for the antifriction rollers 4. The races and rollers are preferably the same as shown in United States Patent, No. 785,944, granted to William C. Fownes, Jr. We have shown two sets of races, with three races in a set, the adjacent races of each set being without the rollers, but we do not confine ourselves to a definite number of sets or to a definite number of races in a set or to a definite number of races occupied by rollers, or even to the presence of the races and rollers, unless they are specifically named in the claims.

The rollers track or roll on the outer surface of the metal sleeve 5, which encircles the axle and extends from the shoulder or collar 6 on the axle to the outer end of the hub. The sleeve 5 has its inner end in engagement with the shoulder 6 and is provided externally at about the middle of its length with the collar or bearing 7, which may be brazed thereto as shown in Fig. 3, or otherwise secured thereto by upsetting or flanging, as shown in Fig. 2 or otherwise, so as to be rigid therewith. The bearing 7 lies between the said two sets of races 3, above described.

A second collar or bearing ring 8 surrounds the sleeve 5 and is secured by rivets or otherwise to the flange of one of the races 3, as shown in Fig. 2, this bearing ring having one face in frictional contact with one face of the bearing 7. It is clear that other means may be provided for supporting the bearing 8, but if the races are employed, one of them furnishes a convenient support therefor.

The outer end of the hub 2 is covered by the plate 9, which has a central opening for the axle 1, and furnishes an abutment for the outer race 3 and a stop to hold the rollers 4 in the said race.

The hollow oil-conductor 10 is arched over the end of the axle 1 and is preferably attached by rivets to diametrically opposite places on the outer end of the hub. The oil-conductor is provided with the inlet opening 11 opposite the center of the axle. The oil introduced through the opening 11 flows through the oil ducts 12 in the said oil-conductor into the ducts 13 which lead through the plate 9 and the hub 1 to points in alinement with the space between the said two sets of races or their equivalent. By this construction the oil is admitted from the oil ducts directly to the bearings 7 and 8 which are the parts of the wheel that sustain the endwise thrusts of the wheel on the axle. In wheels as usually constructed, the said thrusts are taken by the collar 6 and the inwardly extending hub-flange 14 at the inner end of the hub, and by a washer or nut at the outer end thereof. The collar 6 and the flange 14 and adjacent portions of the hub and axle have been found very difficult to be kept well oiled, these parts often becoming dry and worn before their condition became known. With our construction the thrusts are entirely taken from the said flange and collar.

The rotation of the wheel and the action of gravitation cause the flow of oil to the ducts 13. The oil may occupy the spaces about the races and rollers without flowing out at the end of the hub, provided its level is not above the lower edge of the flange 14 or of the openings in the plate 9. The packing 15 is placed between the hub 2 and the plate 9, and the packing 16, between said plate and the oil-conducting device 10.

The pin 17 is placed through the axle at the outer end of the hub, but preferably out of contact therewith, and serves to prevent the wheel from slipping off from the axle in case the bearing 7 should become loose on the sleeve 5. It will be noticed that this pin or any equivalent device is readily accessible without the necessity of removing the oil-conductor 10. In prior wheels which have the ends of the hub and axle entirely covered by a cap, the pin 17 is not accessible at all times, as the cap must be first removed. This requires removable fastenings, as nuts and bolts, for the cap. Such fastenings are not satisfactory as they are liable to become loose and permit the joints between the parts to leak, thus wasting the oil and permitting the bearing to become dry. The frequent removal and replacement of the caps also causes leakage of oil owing to the injury to the packing, or want of care in making the joint tight. All these defects we avoid by making the said joints permanent when the wheel is built.

The sleeve 5 is preferably made loose on the axle so that the same may revolve and thereby distribute the wear uniformly around the same. In car-wheels the under side of the axle becomes worn the most rapidly, as is clear. If our sleeve were rigid on the axle, it would become worn rapidly on its under side. By making the sleeve loose on the axle, it slowly rotates on the axle, thus continually presenting a fresh surface to sustain the pressure and wear of the rollers 4. This feature, while not being absolutely essential in all the embodiments of the present invention, is a very important one, inasmuch as it prolongs the life of the sleeve many times.

We do not limit ourselves to the precise construction shown and described, but desire our claims to cover all devices which are fair equivalents thereof.

We claim—

1. The combination of a bearing, a sleeve concentric therewith, a wheel concentric with and rotatable on the sleeve, and a pair of coöperating lateral thrust-bearing members, one carried by the sleeve and the other by the wheel, the thrust-bearing member on said sleeve being composed of a fold of the wall thereof.

2. The combination of a bearing, a wheel concentric therewith and rotatable thereon, flanged race rings in the wheel-hub, anti-friction rollers in a selected number of said race-rings, a lateral thrust-bearing member secured to one of the race-rings, and a second lateral thrust-bearing member in engagement with the first thrust-bearing member.

Signed at Pittsburg, Pa., this 6th day of July, 1906.

WILLIAM C. FOWNES, Jr.
ROBERT J. GARDNER.

Witnesses:
F. N. BARBER,
ALICE E. DUFF.